United States Patent [19]

Shirasyouji et al.

[11] Patent Number: 5,441,093
[45] Date of Patent: Aug. 15, 1995

[54] MOTORCYCLE RADIAL TIRE WITH FOLDED BREAKER PLY AND SPIRALLY WOUND BAND PLY

[75] Inventors: Hisashi Shirasyouji, Kobe; Eiji Nakasaki, Kakogawa, both of Japan

[73] Assignee: Sumitomo Rubber Industries, Ltd., Hyogo, Japan

[21] Appl. No.: 233,720

[22] Filed: Apr. 26, 1994

Related U.S. Application Data

[63] Continuation of Ser. No. 720,213, Jun. 26, 1991, abandoned.

[30] Foreign Application Priority Data

Jun. 27, 1990 [JP] Japan .................. 2-169622

[51] Int. Cl.$^6$ .................. B60C 3/04; B60C 9/20; B60C 9/26; B60C 15/00
[52] U.S. Cl. .................. 152/454; 152/527; 152/528; 152/529; 152/531; 152/533; 152/537; 152/538; 152/552; 152/554; 156/117
[58] Field of Search .................. 152/454, 528, 529, 531, 152/533, 536, 552, 554, 555, 527, 537, 538; 156/117

[56] References Cited

U.S. PATENT DOCUMENTS

| | | | |
|---|---|---|---|
| 3,973,612 | 8/1976 | Mezzanotte | 152/529 |
| 4,989,658 | 2/1991 | Maathuis et al. | 152/533 |
| 5,105,866 | 4/1992 | Miwa | 152/538 |
| 5,176,770 | 1/1993 | Okuni | 152/533 X |
| 5,198,051 | 3/1993 | Suzuki et al. | 152/533 X |
| 5,234,043 | 8/1993 | Suzuki et al. | 152/533 X |
| 5,379,818 | 1/1995 | Suzuki et al. | 152/533 X |

FOREIGN PATENT DOCUMENTS

| | | | |
|---|---|---|---|
| 0361871 | 4/1990 | European Pat. Off. . | |
| 0364291 | 4/1990 | European Pat. Off. . | |
| 2619533 | 2/1989 | France . | |
| 3535064 | 4/1986 | Germany . | |
| 1190502 | 7/1989 | Japan | 152/528 |
| 1487426 | 9/1977 | United Kingdom | 152/533 |
| 2102354 | 2/1983 | United Kingdom | 152/544 |
| 2163709 | 3/1986 | United Kingdom . | |

*Primary Examiner*—Adrienne Johnstone

[57] ABSTRACT

A motorcycle radial tire which comprises a tread curved so that the maximum cross section width of the tire lies between the tread edges, a carcass having at least one ply of organic fiber cords extending between beads of the tire and turned up around bead cores disposed one in each bead, a belt disposed radially outside the carcass and comprising a breaker and a band, the breaker comprising a first ply disposed adjacently to the carcass and a second ply disposed on the radially outside of the first ply, the first and second breaker plies made of parallel cords inclined with respect to the tire equator so that the first ply cords cross the second ply cords, the edges of the first breaker ply folded back upon the second breaker ply so that a space is provided between the axially inner edges of the folded portions, the band disposed radially outside the breaker to extend over said space, the band comprising a ply of organic fiber cords wound spirally at an angle of not more than 5 degrees with respect to the tire equator to form the radially outermost belt ply, said radially outermost belt ply having a symmetrical cord arrangement with respect to the tire equator.

9 Claims, 3 Drawing Sheets

Fig. 5
CONVENTIONAL
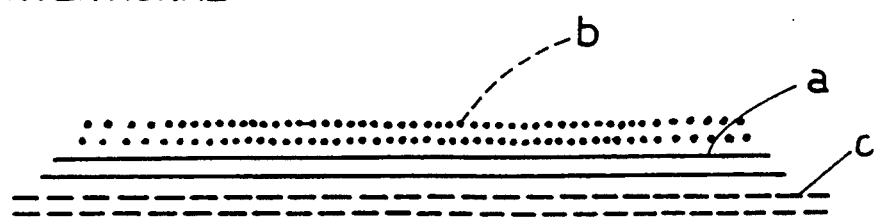

MOTORCYCLE RADIAL TIRE WITH FOLDED BREAKER PLY AND SPIRALLY WOUND BAND PLY

This application is a continuation of application Ser. No. 07/720,213 filed on Jun. 26, 1991, now abandoned.

The present invention relates to a motorcycle radial tire, in which cornering performance, directional stability during straight running, durability, and the like are improved.

BACKGROUND OF THE INVENTION

Recently, a radial ply tire has been used widely in motorcycles. Such a radial tire is generally provided with belt reinforcements radially outside the carcass. As shown in FIG. 5, a conventional belt structure comprises a breaker (a) on the carcass (c) and a band (b) disposed on the radially outside the breaker. Each ply is formed by winding a full width tire fabric, and the band has an overlap joint. As to high speed durability, tire uniformity, tread wear resistance, stability during high speed straight running and high speed cornering, and the like, such a belt construction is not enough for motorcycle tires for high speed use, especially for large-sized heavy motorcycles.

SUMMARY OF THE INVENTION

It is therefore, an object of the present invention to provide a motorcycle radial tire in which high speed durability, running stability during high speed straight running and also high speed cornering and the like are improved.

According to one aspect of the present invention, a motorcycle radial tire comprises
 a tread curved so that the maximum cross section width of the tire lies between the tread edges,
 a carcass having at least one ply of organic fiber cords extending between beads of the tire and turned up around bead core disposed one in each bead,
 a belt disposed radially outside the carcass and comprising a breaker and a band,
 the breaker comprising a first ply disposed adjacently to the carcass and a second ply disposed on the radially outside of the first ply,
 the first and second breaker plies made of parallel cords inclined with respect to the tire equator so that the first ply cords cross the second ply cords,
 the edges of the first breaker ply folded back upon the second breaker ply so that a space is provided between the axially inner edges of the folded portions,
 the band disposed radially outside the breaker to extend over the space, and
 the band comprising a ply of organic fiber cords wound spirally at an angle of not more than 5 degrees with respect to the tire equator to form the radially outermost belt ply, the radially outermost belt ply having a symmetrical cord arrangement with respect to the tire equator.

BRIEF DESCRIPTION OF THE DRAWINGS

Embodiments of the present invention will now be described in detail in conjunction with the accompanying drawings, in which:

FIG. 5 is a schematic cross sectional view showing a conventional belt structure.

DETAILED DESCRIPTION OF THE INVENTION

Figure 1:
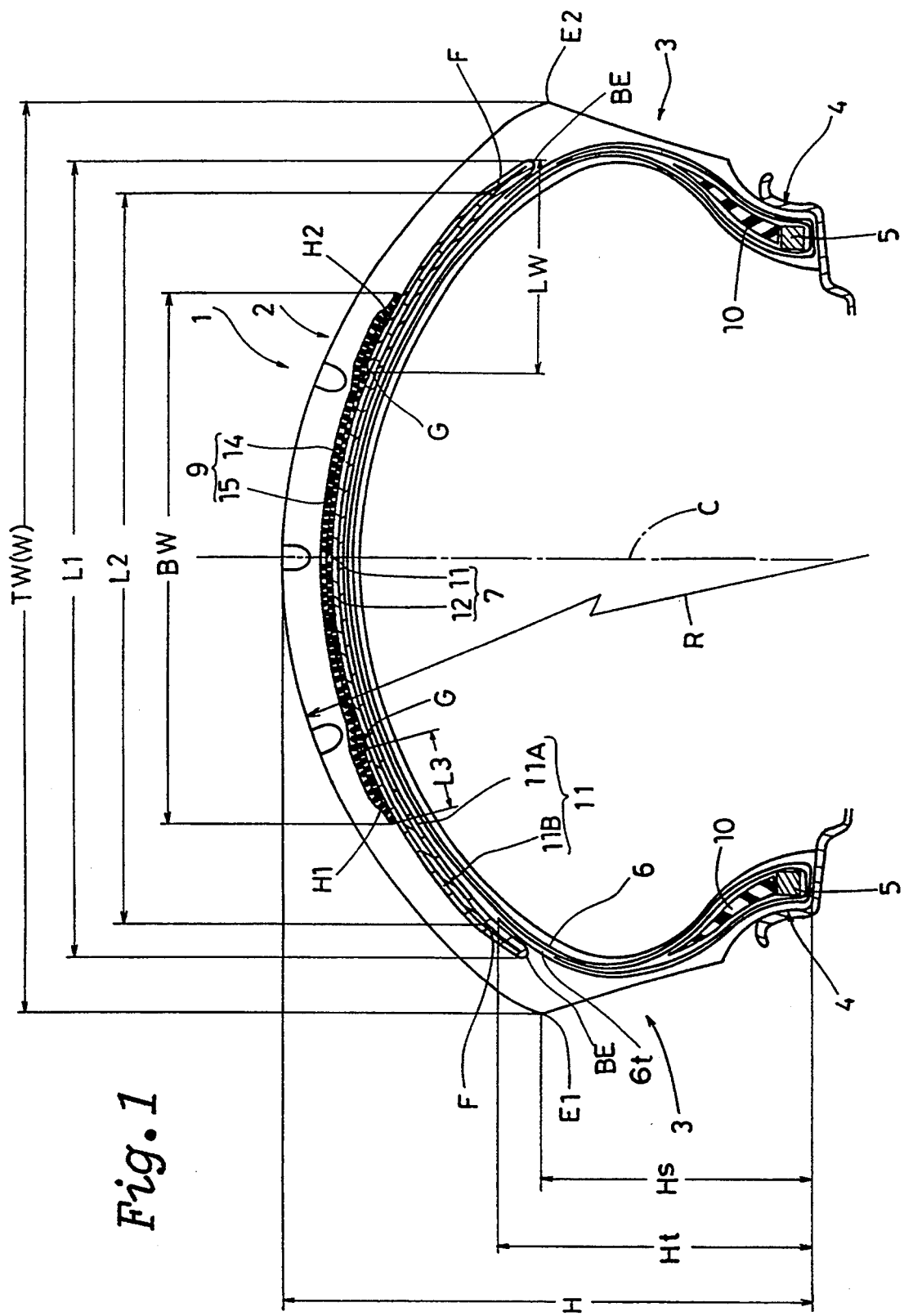
FIG. 1 is a cross sectional view of a tire of the present invention.
Figure 2:
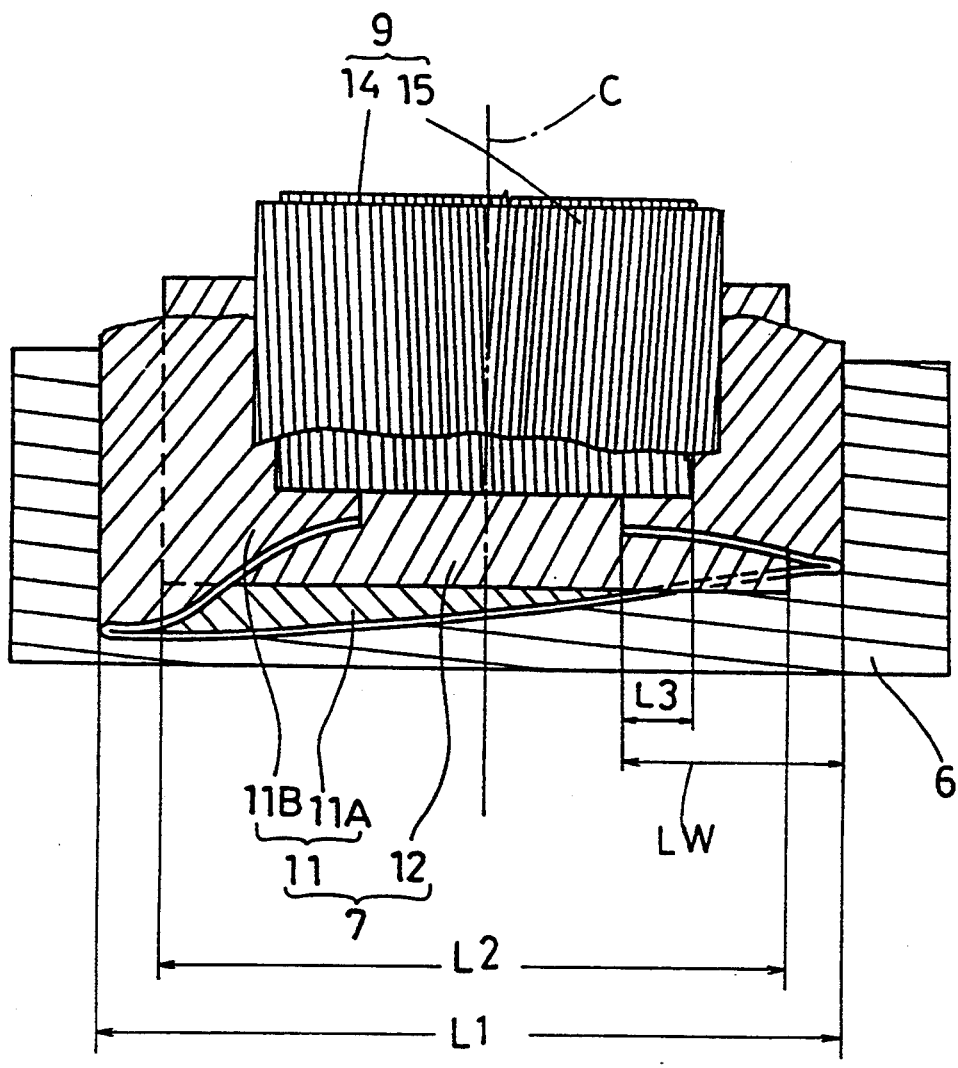
FIG. 2 is a developed plan view of the belt in FIG. 1.

In the figures, motorcycle radial tire 1 has a tread portion 2, a pair of axially spaced bead portions 4 and a pair of sidewall portions 3 extending therebetween.

The aspect ratio of the tire (cross section height H/cross section width W) is 0.5 to 0.7.

The tire 1 comprises a pair of bead cores 5 disposed one in each bead portion 4, a carcass 6 extending between the bead portions 4 and turned up around the bead cores 5 from the axially inside to outside thereof, belt reinforcements including a breaker 7 disposed in the tread portion and radially outside the carcass 6 and a band 9 disposed radially outside the breaker, and a rubber bead apex 10 disposed in each bead portion and extending radially outwardly and taperingly from the bead core.

The tread portion 2 is curved so that the tread face has a single radius of curvature.

The tread face extends axially outwardly from the tire equator C toward both sides thereof so that the maximum cross section width W of the tire lies between the edges E1 and E2 of the tread. The radius R of the curvature of the tread face is 0.54 to 0.85 times the tread width TW.

The carcass 6 comprises at least one ply, in this embodiment two plies of cords arranged radially of the tire at an angle of 85 to 90 degrees with respect to the tire equator C.

For the carcass cords, organic fiber cords, e.g. nylon, polyester, aromatic polyamide and the like can be used. In this embodiment nylon fiber cords are used.

The radial height Ht of the turned up portion 6t of the carcass 6 measured from the bead base line is larger than the radial height Hs of the tread edge E1, E2 measured from the bead base line, and the radially outer edge of the carcass turned up portion is secured between the breaker edge portion and the main portion of the carcass, whereby a ply separation failure starting from the carcass ply edge is prevented and the sidewalls are effectively reinforced.

The breaker 7 comprises a first ply 11 disposed on the radially outside of the carcass 6 and a second ply 12 disposed on the radially outside of the first ply 11.

Each ply is made of rubberized parallel cords laid at an angle of 15 to 25 degrees with respect to the tire equator C so that the cords thereof cross the cords of the adjacent ply. Each of the first and second breaker plies are made of a sheet of parallel cords.

The edges of the radially inner first ply 11 are folded back upon the radially outer second ply 11 so as to wrap the edges F of the second ply 12.

For the breaker cords, organic fiber cords, e.g. nylon, rayon, polyester, aromatic polyamide and the like and steel cords can be used.

In this embodiment, aromatic polyamide fiber cords are used in the radially inner and outer plies of the breaker.

The width L1 of the first breaker ply 11 measured between the edges BE in the axial direction of the tire, is 0.85 to 0.95 times the tread with TW.

In the first ply 11, the axial width LW of the folded portion 11B between the edges G and BE is 0.15 to 0.30 times the tread width TW, and between the axially edges G a space is formed.

By setting the width of the folded portions 11B as explained above, the folded portion 11B may be located in the ground contacting region when the motorcycle is leaned during cornering.

The width L2 of the second ply 12 measured between the edges F in the axial direction of the tire is 0.75 to 0.90 times the tread width TW, and less than the first ply width L1.

Between the first breaker ply edge and the second breaker ply edge, the radially outer edge of the carcass turned up portion 6t is located.

The band 9 comprises two plies 14 and 15 of spiral cords 21.

For the band cords 21, organic fiber cords, for example nylon, rayon, aromatic polyamide, polyester and the like are used.

Preferably, and in this embodiment, nylon cords are used. The width BW of the band 9 is not more than 0.7 times the tread width TW.

Figure 3:
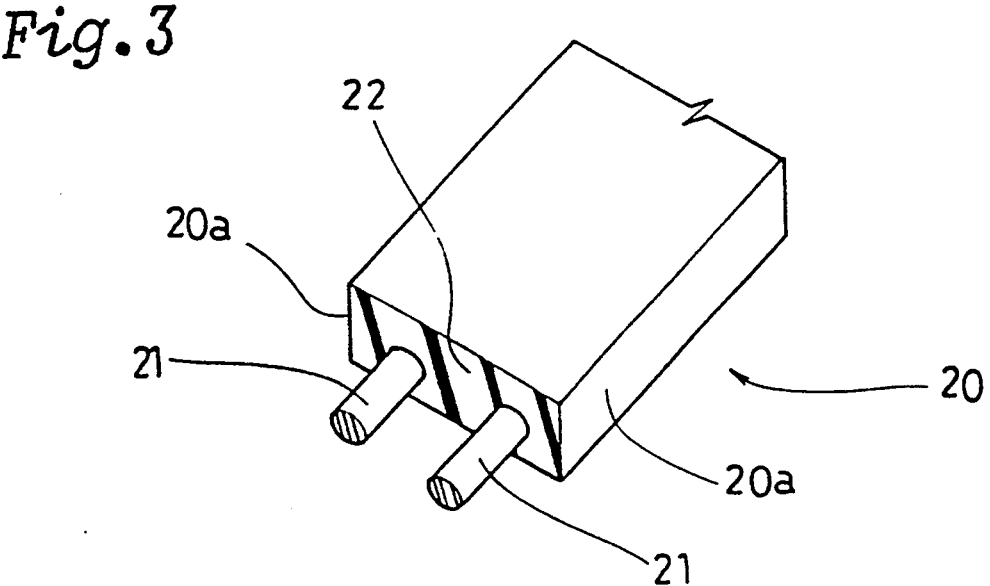
FIG. 3 is a part perspective view of a ribbon of rubber in which band cords are embedded.
Figure 4:
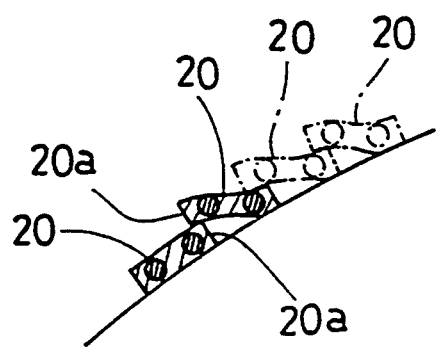
FIG. 4 is a cross sectional view explaining a band cord winding method.

Each ply is formed by winding a ribbon 20 as shown in FIGS. 3 and 4.

In the ribbon 20, one cord or parallel cords 21 are embedded in rubber 22 along the longitudinal direction thereof.

To make the inner ply 14, the ribbon 20 is wound spirally around the breaker 11 and continuously from a point H1 to a point H2 which are respectively located at the above-mentioned folded portions 11B.

The inner ply 14 is therefore, made of at least one spiral cord which is continuous from one edge to the other edge.

The width L3 of the overlap of the inner band ply 14 and the folded portion 11B is 10 to 30 mm.

To make the outermost ply 15, two ribbons 20 are used. The ribbons are wound from points located axially outward of the above-mentioned points H1 and H2 to the tire equator C so that the winding direction in a half portion on one side of the tire equator is the reverse of that in the remaining half portion on the other side of the tire equator.

The outer ply 15 is accordingly wider than the inner ply 14. The outer ply 15 is provided with a cord arrangement which is symmetrical with respect to the tire equator, and in half portion on each side of the tire equator at least one cord extends spirally and continuously from the tire equator to the edge.

The band cord angle is not more than 5 degrees with respect to the tire equator C.

In order to prevent looseness of the ribbon 20 during winding, the edges 20a are preferably overlapped as shown in FIG. 4.

Test tires of size 170/60R17 including the Example tire having the belt construction shown in FIG. 1 and the Reference tire having the belt construction shown in FIG. 5 were prepared and the following tests were made. The specifications of the test tires and test results are given in Table 1.

TABLE 1

|  | Example | Reference |
|---|---|---|
| Carcass | 2 plies | 2 plies |
| Cord material | Nylon 1260d/2 | Nylon 1260d/2 |
| Belt | FIG. 5 | FIG. 5 |

TABLE 1-continued

|  | Example | Reference |
|---|---|---|
| Construction |  |  |
| Breaker | 2 plies | 2 plies |
| Cord material | Aromatic polyamide 1500d/2 | Nylon 1260d/2 |
| Angle (deg) | 20 | 18 |
| Band | 2 plies | 2 plies |
| Angle (deg) | approx. 0 | approx. 0 |
| Tire weight (index) | 98 | 100 |
| Test results |  |  |
| 1) Grip | 120 | 100 |
| 2) Cornering stability | 110 | 100 |
| 3) Separation | non | 6–15 mm* |
| 4) Durability | 280 km/hr | 250 km/hr |

*separation length after 15000 km run

1) Grip performance
While a motorcycle provided with the test tire was run on a straight course at a speed of 260 km/hr and on a 400 m radius course at a speed of 220 km/hr, road grip was evaluated by a test driver.
The results are indicated by an index based on the assumption that the reference tire is 100. The larger the value, the better the performance.

2) High-speed Cornering Stability
In the above-mentioned test run on 400 m radius course, the cornering stability was evaluated by the test driver.
The results are indicated by an index based on the assumption that the reference tire is 100. The larger the value, the better the performance.

3) Resistance to ply separation
Using a drum tester, the total running distance to separation failure when running at a speed of 65 km/hr under a normal pressure specified in JIS and a 150% load of the maximum load also specified in JIS, was measured as the resistance to ply separation.

4) High speed durability
Using a drum tester, the running speed at which the tread was broken was measured under the above-mentioned normal pressure and maximum tire load both specified in JIS, while increasing the running speed every 20 minutes by a 10 km/hr step from an initial speed of 200 km/hr.
It was confirmed that the tires of the invention may endure a high speed running at 280 to 300 km/hr.

In the present invention, the inner band ply 14 may have a cord arrangement which is symmetrical with respect to the tire equator like the outermost ply.

Further, the inner band ply 14 may have a conventional construction formed by winding a full width rubberized fabric in which plural cords are embedded in parallel with each other, instead of the above-mentioned narrow width ribbon.

In the above-mentioned embodiment, the same material cords, i.e., aromatic polyamide fiber cords are used in the inner and outer breaker plies. It is however, possible to use different material cords. For example, steel cords are used in the radially outer ply 12 and aromatic polyamide fiber cords are used in the radially inner ply 11. In this case, the breaker is preferably provided between the inner fold ply and the outer cutend ply with a difference in rigidity by setting properties as follows:

The cords of the inner ply 11 have an initial modulus of elasticity of 300 to 6000 kgf/sq.mm. preferably 300 to 4500 kgf/sq.mm.

The 100% modulus of the topping rubber for the inner ply 11 is 30 to 48 kgf/sq.cm, preferably not more than 45 kgf/sq.cm. The cords of the outer ply 12 have an initial modulus of elasticity larger than that of the inner ply cords, and more than 4500 kgf/sq.mm.

The 100% modulus of the topping rubber for the outer ply 12 is larger than that of the inner ply, and 48 to 55 kgf/sq.cm. The number of cord twists in the aromatic polyamide fiber cord is not less than 40 turn/10 cm.

As described above, the motorcycle radial tire of the present invention, has a breaker ply of which edge portions are folded back so as to provide a space between the axially inner edges of the folded portions, and a jointless band extending over the space to cover the axially inner edge of each folded portion. Therefore, the tread is provided in the shoulder regions with a larger reinforcement in comparison with the central region to increase the chamber thrust. As a result, a directional stability during high speed straight running and a running stability and road grip during high speed cornering are improved.

Further, for the folded-edge construction, the breaker is prevented from separation failure at the breaker edges, and a durability is effectively improved.

As the radially outermost belt ply has a cord arrangement which is symmetrical with respect to the tire equatorial plane, the directional stability during straight running is further improved.

The present invention is suitably applied to tires for large size motorcycles with a displacement of 750 cc or more, especially rear tires for high speed use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle radial tire comprising
   a tread portion curved so that the maximum cross section width of the tire lies between the tread edges,
   a carcass having at least one ply of organic fiber cords extending between beads of the tire and turned up around bead cores disposed one in each bead to form a pair of turned up portions and a main portion therebetween,
   a belt disposed radially outside the carcass and comprising a breaker and a band,
   the breaker comprising a first ply disposed adjacently to the carcass and a second ply disposed radially outside of the first breaker ply,
   the first and second breaker plies each being made of a sheet of parallel cords inclined with respect to the tire equator so that the first breaker ply cords cross the second breaker ply cords,
   the edges of the first breaker ply being folded back upon the second breaker ply so that a space is provided between the axially inner edges of the two folded portions, the axial width of the first breaker ply being in a range of 0.85 to 0.95 times the tread width, and the axial width LW of each of the folded portions of the first breaker ply being in a range of 0.15 to 0.30 times tread width,
   the band being disposed radially outside the breaker to extend over the space, the width of the band being no greater than 0.7 times the tread width, and
   the band including a radially inner ply and a radially outermost ply, said inner ply having a first and a second axial edge and being formed of at least one continuous organic fiber cord which is wound spirally and continuously between said first edge and said second edge, said outermost ply being made of organic fiber cords wound spirally, the cords of said outermost ply being wound at an angle in the range of from greater than 0 degrees to 5 degrees with respect to the tire equator, said outermost ply having a symmetrical cord arrangement with respect to the tire equator, wherein
   the turned up portions extending radially outwardly into the tread portion so that the radially outer edges thereof are secured between the breaker edge portions and the main portion,
   the band and each folded portion of the first breaker ply overlap by a width of 10 to 30 mm,
   the breaker includes at least one aromatic polyamide cord ply,
   the band includes at least one nylon cord ply,
   said outermost ply is wider than said inner ply, and
   in said outermost ply, the cords winding direction in a half portion on one side of the tire equator is the reverse of that in the remaining half portion on the other side of the tire equator.

2. The tire according to claim 1, wherein each of the first and second breaker plies is reinforced by aromatic polyamide fiber cords.

3. The tire according to claim 1, wherein the first ply of the breaker is made of aromatic polyamide fiber cords, and the second ply of the breaker is made of steel cords.

4. The tire according to claim 3, wherein
   the initial modulus of elasticity of the first breaker ply cords is 300 to 6000 kgf/sq.mm,
   the 100% modulus of the topping rubber for the first breaker ply is 30 to 48 kgf/sq.cm,
   the initial modulus of elasticity of the second breaker ply cords is larger than that of the first ply cords, and more than 4500 kgf/sq.mm, and
   the 100% modulus of the topping rubber for the second breaker ply is larger than that of the first breaker ply and is 48 to 55 kgf/sq.cm.

5. The tire according to claim 4, wherein the number of cord twists in the aromatic polyamide fiber cord is not less than 40 turn/10 cm.

6. The tire according to claim 1, wherein the aspect ratio of the tire is 0.5 to 0.7.

7. The tire according to claim 1, wherein the carcass is made of nylon fiber cords.

8. The tire according to claim 1, wherein the band is made of nylon fiber cords.

9. The tire according to claim 1, wherein at least one of the first and second breaker plies is an aromatic polyamide cord ply, and said outermost ply is a nylon cord ply.

* * * * *